United States Patent
Lee et al.

(10) Patent No.: US 6,341,116 B1
(45) Date of Patent: Jan. 22, 2002

(54) COMPACT OPTICAL PICK-UP HEAD EMPLOYING NON-DIFFRACTIVE ELEMENT

(75) Inventors: Yuan-Chin Lee; Zu Wen Chao, both of Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 09/376,666

(22) Filed: Aug. 16, 1999

(30) Foreign Application Priority Data

Apr. 13, 1999  (TW) ............................ 88105833

(51) Int. Cl.[7] ............................................ G11B 7/12
(52) U.S. Cl. ........................ 369/112.02; 369/112.28; 369/110.01
(58) Field of Search ................. 369/44.11, 44.12, 369/44.14, 44.23, 44.37, 47.1, 53.1, 110.01, 110.04, 112.01, 112.02, 112.09, 112.21, 112.28

(56) References Cited

U.S. PATENT DOCUMENTS

| | | | | |
|---|---|---|---|---|
| 3,643,178 A | * | 2/1972 | Marshall | 372/24 |
| 4,546,463 A | * | 10/1985 | Opheij et al. | 369/112.17 |
| 4,730,297 A | * | 3/1988 | Ishibashi et al. | 369/112.16 |

* cited by examiner

*Primary Examiner*—Muhammad Edun
(74) *Attorney, Agent, or Firm*—W. Wayne Liauh

(57) ABSTRACT

A compact optical pickup head which doesn't utilize a holographic optical element is disclosed. A birefringent prism and a quarter-wave plate are disposed in the optical path of the compact pickup head. The birefringent prism is consisted of two crystals made from a birefringent material, and having their optical axes perpendicular to each other. Therefore, the laser source beam will not be refracted when passing through the birefringent prism or will be refracted to a direction differing from the returning beam), while the returning beam is refracted by the birefringent prism to the photo detector. The power of laser ray is fully utilized to increase the reliability of signal transformation. A higher optical signal can be obtained, and the interference of returning beam to the source beam is also be prevented.

7 Claims, 4 Drawing Sheets

COMPACT OPTICAL PICK-UP HEAD EMPLOYING NON-DIFFRACTIVE ELEMENT

FIELD OF THE INVENTION

The present invention generally relates to a compact optical pickup head, and more particularly to an optical pickup head for recording and reproducing information on and from an optical disc, such as a CD or a DVD, in which no diffractive element is used.

BACKGROUND OF THE INVENTION

It is known that optical pickup heads are used to record and reproduce information such as video or audio data on and from optical data recording media. In a conventional pickup head, the laser diode and the photo detector are installed apart. The optical path of the pickup head is mainly designed with a polarized beam splitter (PBS) installed therein. The polarized beam splitter separates the returning laser beam, which carries data information from the data surface of the recording media, from the same path in reverse of the source laser beam, and guides the returning beam to the photo detector for converting into corresponding electrical signals. The polarized beam splitter makes the pickup head a larger size.

A compact pickup head of related art uses a laser diode and a photo detector incorporated in a single package. The laser diode and the photo detector are almost installed in a same plane and left only with a little distance less than 1 mm apart. The laser diode and photo detector package and some other optical elements constitute a compact pickup head which has a size smaller than conventional pickup heads. The conventional compact pickup head as shown in FIG. 1 uses a holographic optical element (HOE) 91 to process the laser beam. The laser beam emitted from a laser source 90 is split by the holographic optical element 91 into three beams which are the 0 order beam AA, +1 order beam AB and −1 order beam AC. Only one (generally the beam AA) of them is guided through a collimator lens 92, a reflection mirror 93 and an objective lens 94 to the optical recording medium 95. The reflective laser beam carrying data information from the data surface of the recording medium 95 passes reversely through the objective lens 94, the reflection mirror 93 and the collimator lens 92 to the holographic optical element 91, and is further split into the 0 order beam AE, +1 order beam AD and −1 order beam AF. By the function of the holographic optical element 91, only one of them (for example, the −1 order beam AF) is guided to the photo detector 96 for converting optical information into corresponding electrical signals.

But the holographic optical element 91 will waste a lot of the laser power. Supposing the holographic optical element 91 will split a laser source of intensity 1 into 0 order beam of intensity T, +1 order beam of intensity (1−T)/2 and −1 order beam of intensity (1−T)/2, then the intensity I of the returning beam toward the photo detector can be calculated as I=T(1−T)/2. To maximize the intensity I, the intensity T of 0 order beam has to be T=½, and the maximum intensity I is I=⅛. Therefore, using the holographic optical element will waste at least ⅞ of the laser power. The decrease of the returning laser power causes difficulty in signal transformation and lowers the reliability of data retrieval.

SUMMARY OF THE INVENTION

The primary objective of the present invention is therefore to provide a compact optical pickup head which doesn't utilize a holographic optical element.

Another objective of the present invention is to provide a compact optical pickup head in which the power of laser ray is fully utilized to increase the reliability of signal transformation.

According to the present invention, a birefringent prism and a quarter-wave (¼ λ) plate are disposed in the optical path of a compact pickup head. The birefringent prism is consisted of two crystals made from a birefringent material, and having their optical axes perpendicular to each other. The birefringent prism can be chosen from a Rochon, a Sernarmont or a Wollaston prism which has different refractive indexes for polarized beams in different polarization direction. Therefore, the laser source beam will not be refracted when passing through the birefringent prism (in case of a Rochon or a Sernarmont prism) or will be refracted to a direction differing from the returning beam (in case of a Wollaston prism), while the returning beam is refracted by the birefringent prism to the photo detector. So, the laser power will not be wasted, a higher optical signal can be obtained, and the interference of the returning beam to the laser source is also be prevented.

BRIEF DESCRIPTION OF DRAWINGS

The above objectives and advantages of the present invention will become more apparent from the following detailed description preferred embodiments thereof with reference to the attached drawings in which.

DETAILED DESCRIPTION OF PREFERRED EMBODIMENTS

Figure 1:
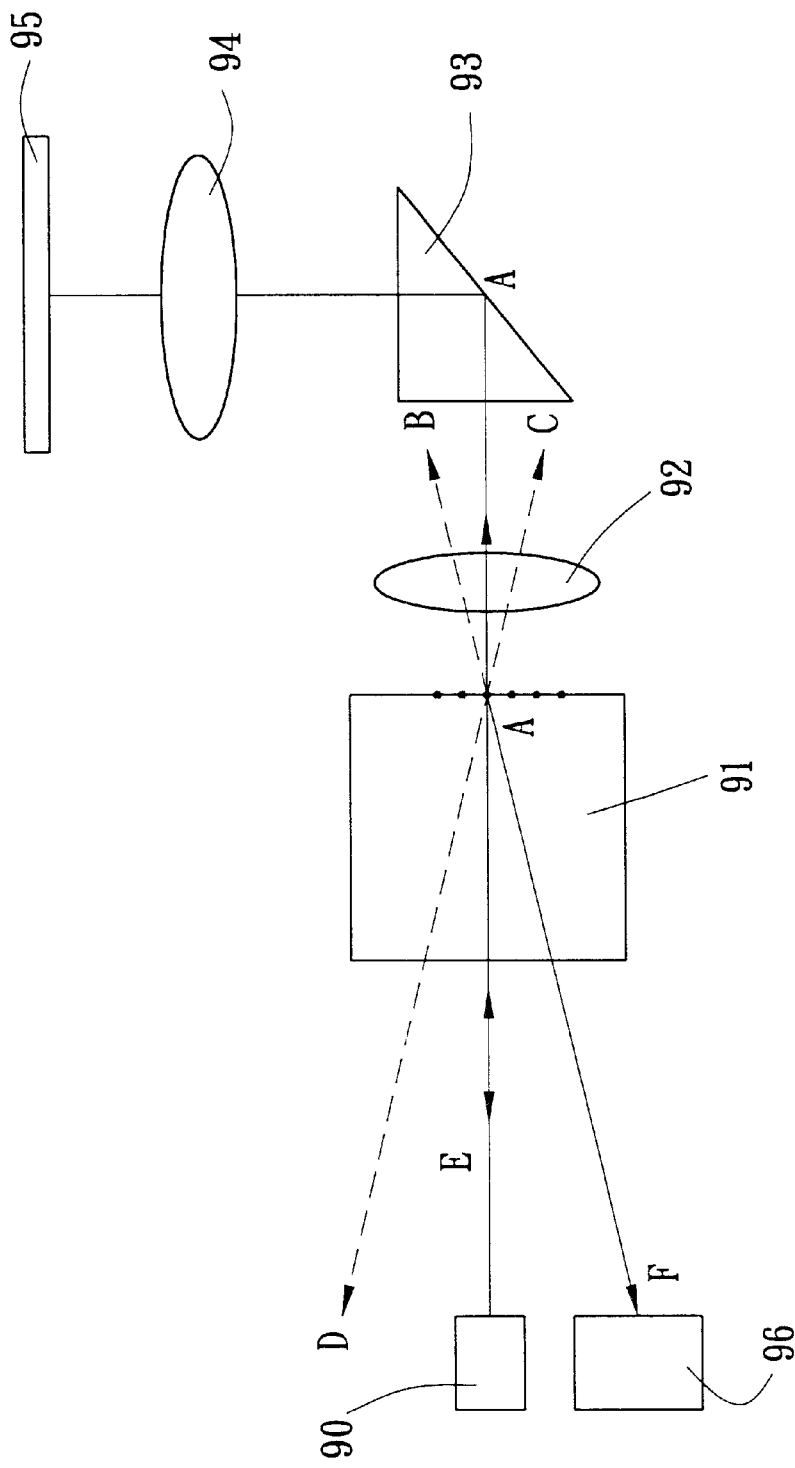
FIG. 1 is a schematic diagram of a conventional compact pickup head showing the optical path of laser beams.
Figure 2:
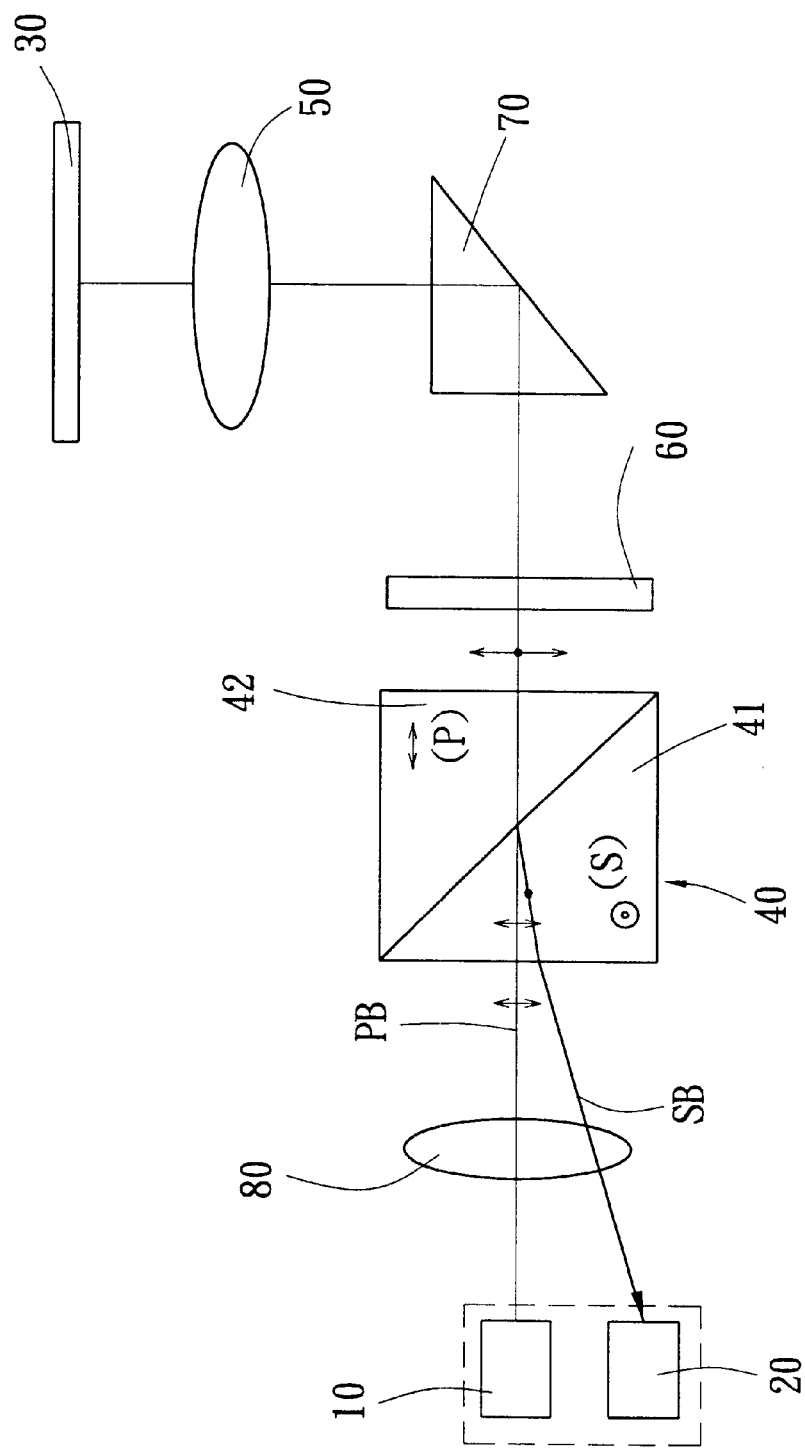
FIG. 2 is constructional view of a compact pickup head according to the present invention using a Rochon prism.

Referring to FIG. 2, a compact pickup head according to the present invention, comprising:

a laser source 10, generally a laser diode, for generating a linearly polarized beam for recording or reproducing information onto or from an optical data recording medium;

a collimator lens 80, disposed in the optical path of the laser beam, for processing the source laser beam into a parallel beam;

a photo detector 20, packaged in the same substrate with the laser source 10, for transforming the returning beam SB reflecting from the optical data recording medium 30 into electrical signals;

a birefringent prism 40, disposed in the optical path of the compact pickup head, consisted of two conjunctive crystals 41, 42 made from a same birefringent material, for separating the returning beam, which reflects from the optical data recording medium 30, from the laser source beam which is emitted from the laser source 10;

an objective lens 50, disposed in the optical path of the compact pickup head, for focusing the laser source beam onto the optical data recording medium 30;

a quarter-wave (¼ λ) plate 60, disposed in the optical path between the birefringent prism 40 and the objective lens 50, for changing the polarization direction of the returning beam and making the returning beam having a polarization direction perpendicular to that of the laser source beam PB; and a relfection mirror 70, disposed in the optical path between the quarter-wave (¼ λ) plate 60 and the objective lens 50, for changing the direction of the laser beams in order to shrinking the size of the optical path, i.e., the size of the pickup head. If the size is not a concern, the reflection mirror 70 can be omitted.

According to the characteristics of birefringent crystal, there exist two axes which are perpendicular to each other, called a fast axis and a slow axis, are formed in the crystal in which the refractive index of the fast axis is less than that of the slow axis. Further according to the Snell's Law, refraction occurs when a light entering a medium with a different refractive index, so the returning beam having a different polarization direction from the source beam will be refracted to a direction separated from the source beam when passing the birefringent prism 40. It is because that they see different variations of refractive index when they pass the crystal interface.

In the following description, for indicating the two axes of the birefringent crystals in the birefringent prism, the optical axis perpendicular to the drawing surface of the paper is marked with S as the sigma axis, and illustrated with a dot in a circle; while the optical axis parallel to the drawing surface of the paper is marked with P as the parallel axis, and illustrated with a bidirectional arrow.

In the first embodiment of the present invention illustrated in FIG. 2, the birefringent prism 40 is a Rochon prism in which the optical axes of the crystals 41 and 42 are perpendicular to each other. That is, the optical axis of the crystal 41, marked with S and illustrated with a dot in a circle, is perpendicular to the drawing surface of the paper; while the optical axis of the crystal 42, marked with P and illustrated with a bidirectional arrow, is parallel to the drawing surface of the paper.

The wavelength of the laser source 10 in FIG. 2 is λ. The laser beam PB emitted by the laser source 10 with the polarization direction P first passes through the collimator lens 80, then the birefringent prism 40. Since the birefringent prism 40 includes two birefringent crystals 41 and 42 which provide a same refractive index for the beam PB of the laser source 10, it will not influence the direction of the beam PB. The beam PB passes through the birefringent prism 40, the quarter-wave (¼ λ) plate 60, the reflection mirror 70 and the objective lens 50 to the optical data recording medium 30. Then a returning beam carrying information from the data surface of the optical data recording medium 30 is reflected to reversely pass through the objective lens 50, the reflection mirror 70 and the quarter-wave (¼ λ) plate 60 to the birefringent prism 40. When the returning beam passing through the quarter-wave (¼ λ) plate 60, its polarization direction is changed into a sigma beam SB perpendicular to that of the laser source beam PB. Since the two birefringent crystals 41, 42 provide different refractive indexes for the returning sigma beam SB, the returning beam SB is refracted by the birefringent prism 40 and received by the photo detector 20, and eventually transformed into electrical signals representing the information recorded on the optical data recording medium 30.

Figure 3:
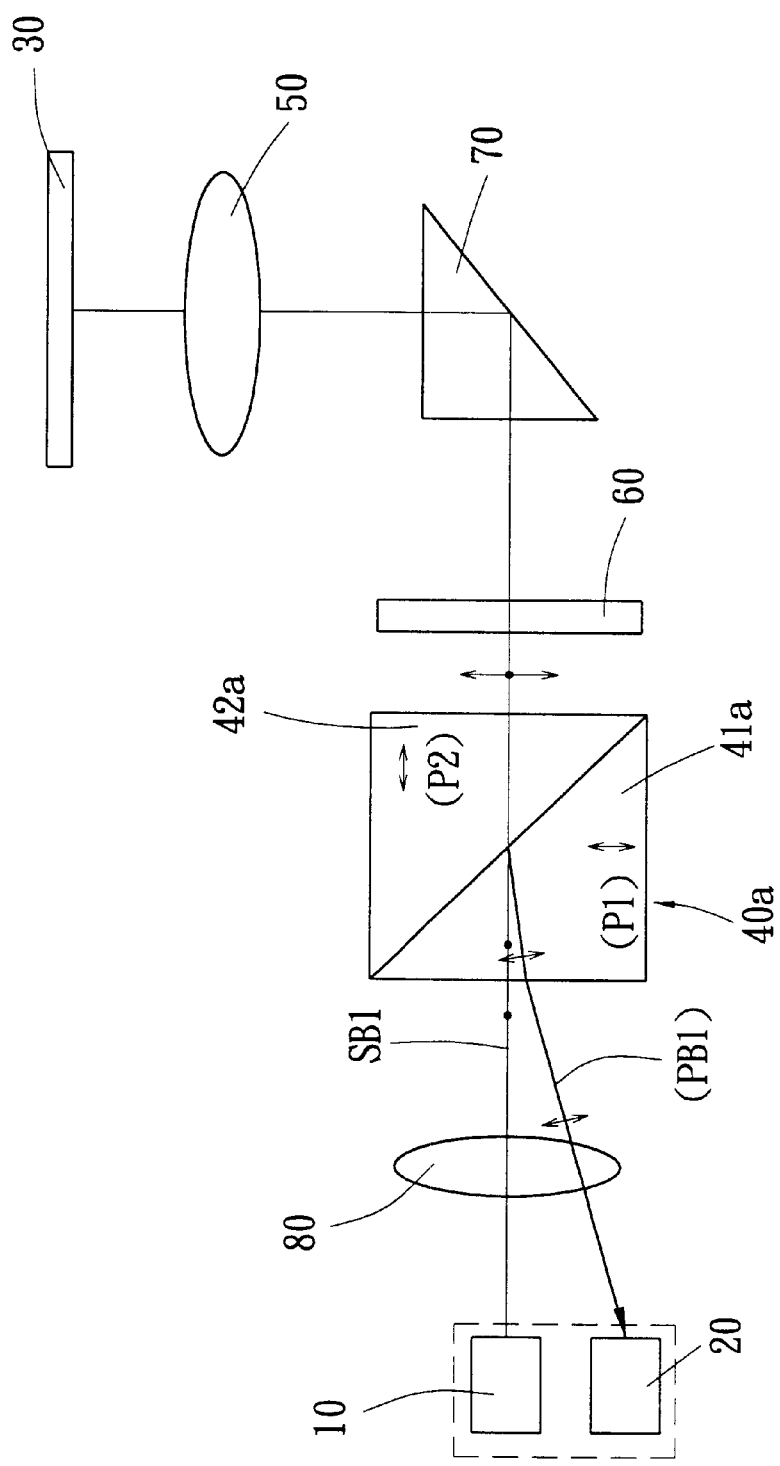
FIG. 3 is constructional view of a compact pickup head according to the present invention using a Sernarmont prism.

In the second embodiment of the present invention illustrated in FIG. 3, the birefringent prism 40a is a Sernarmont prism in which two crystals 41a and 42a having optical axes parallel to the surface of the drawing and perpendicular to each other. Therefore, the sigma beam SB1 emitted by the laser source 10 will not be influenced by the birefringent prism 40a. But the returning parallel beam PB1 carrying information from the data surface of the optical data recording medium 30 is refracted by the birefringent prism 40a before received by the photo detector 20 since the crystals 41a and 42a of the birefringent prism 40a provide different refractive indexes for the parallel beam PB1.

Figure 4:
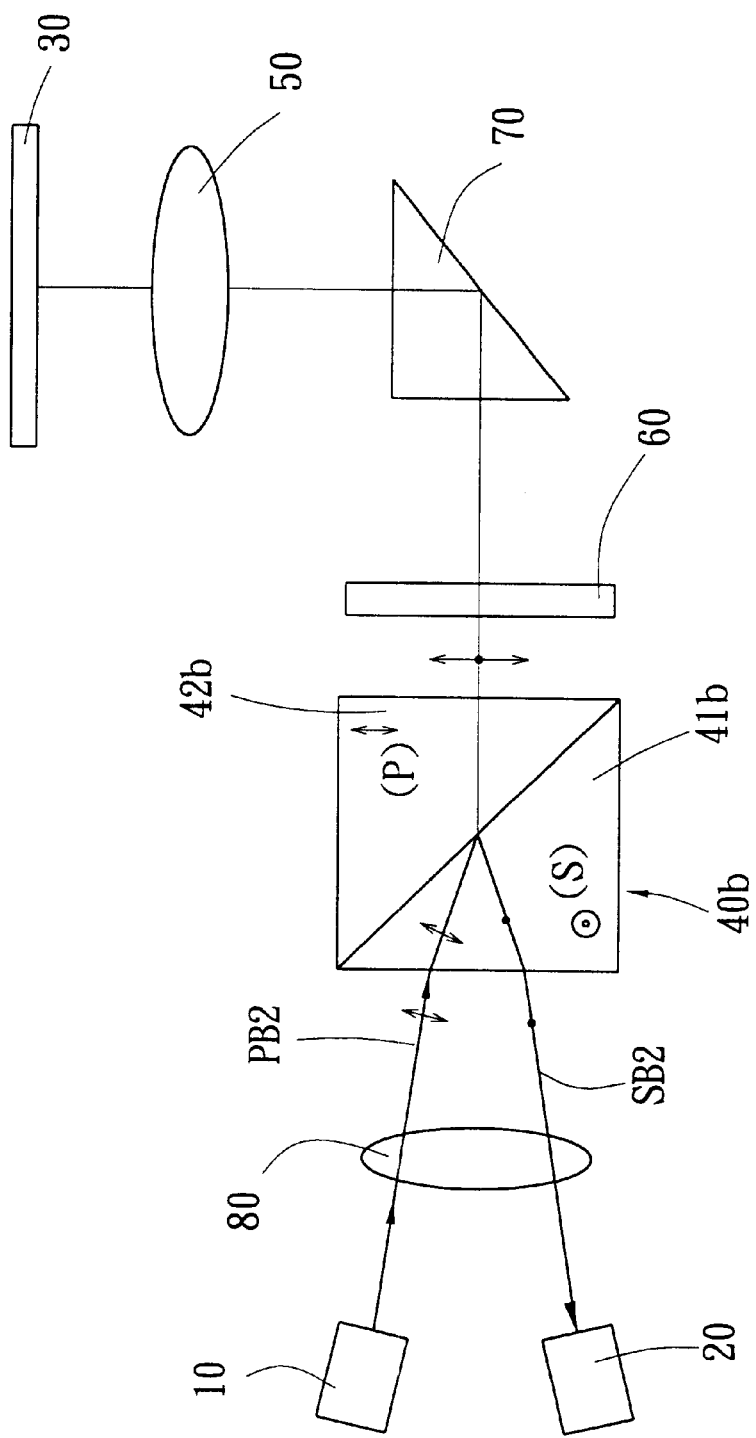
FIG. 4 is constructional view of a compact pickup head according to the present invention using a Wollaston prism.

In the third embodiment of the present invention illustrated in FIG. 4, the birefringent prism 40b is a Wollaston prism in which the optical axes of the crystals 41b and 42b are perpendicular to each other. That is, the optical axis of the crystal 41b, marked with S and illustrated with a dot in a circle, is perpendicular to the drawing surface of the paper; while the optical axis of the crystal 42b, marked with P and illustrated with a bidirectional arrow, is parallel with the drawing surface of the paper but perpendicular basically to the optical path of the laser beam. Since the two birefringent crystals 41b, 42b provide different refractive indexes for the parallel source beam PB2 and the returning sigma beam SB2, the returning beam SB2 and the source beam PB2 can be refracted and separated as shown in the drawing.

The advantages of the present invention are as follows:
1) No diffractive element is used. So the laser power is prevented from losing;
2) Maintaining the power of the returning beam as strong as the source beam. The optical signal provided for the photo detector is several times of strength to that of a conventional compact pickup head; and
3) Preventing the returning beam flowing to the laser source. Therefore, no noise interference to the laser source occurs.

It is to be understood that the drawings are designed for purposes of illustration only, and are not intended as a definition of the limits and scope of the invention disclosed.

What is claimed is:

1. A compact pickup head for recording and reproducing information on and from an optical data recording medium, comprising at least:

a laser source, for generating a linearly polarized beam for recording and reproducing information on said optical data recording medium;

a photo detector, packaged in the same substrate with said laser source, for transforming a returning beam reflecting from said optical data recording medium into electrical signals;

a birefringent prism, disposed in an optical path of said compact pickup head, consisted of two conjunctive crystals made from a birefringent material, for separating said returning beam from a source beam emitted from said laser source, and passing almost the whole power of the laser beams;

an objective lens, disposed in said optical path, for focusing said source beam onto said optical data recording medium; and a quarter-wave plate, disposed in said optical path between said birefringent prism and said objective lens, for changing polarization direction of said returning beam and making said returning beam having a polarized direction perpendicular to that of said source beam.

2. The compact pickup head as recited in claim 1 wherein said birefringent prism is a Rochon prism.

3. The compact pickup head as recited in claim 1 wherein said birefringent prism is a Sernarmont prism.

4. The compact pickup head as recited in claim 1 wherein said birefringent prism is a Wollaston prism.

5. The compact pickup head as recited in claim 1 wherein said two conjunctive crystals of said birefringent prism having optical axes perpendicular to each other.

6. The compact pickup head as recited in claim 1 further comprises a collimator lens disposed in said optical path for processing said source beam into a parallel beam.

7. The compact pickup head as recited in claim 1 further comprises a reflection mirror disposed in said optical path between said quarter-wave plate and said objective lens for reflecting the direction of laser beams.

* * * * *